US008848720B2

(12) United States Patent  
Narippatta et al.

(10) Patent No.: US 8,848,720 B2  
(45) Date of Patent: Sep. 30, 2014

(54) METHOD AND APPARATUS FOR DETERMINING PROPAGATION DELAY IN A NETWORK

(75) Inventors: Vinod Narippatta, Bangalore (IN); Edward E. Sprague, Woodside, CA (US); Ting-Kuang Chiang, Saratoga, CA (US); Chung Kuang Chin, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 478 days.

(21) Appl. No.: 12/732,063

(22) Filed: Mar. 25, 2010

(65) Prior Publication Data

US 2011/0235646 A1     Sep. 29, 2011

(51) Int. Cl.  
*H04L 29/06*     (2006.01)

(52) U.S. Cl.  
USPC .......................................... 370/400; 370/392

(58) Field of Classification Search  
CPC ..... H04L 45/00; H04L 47/10; H04L 29/0653; H04L 29/06  
USPC .......................................... 370/389, 392, 400  
See application file for complete search history.

(56) References Cited

U.S. PATENT DOCUMENTS

| | | | | |
|---|---|---|---|---|
| 6,512,746 | B1 * | 1/2003 | Sand | 370/252 |
| 2004/0071084 | A1 * | 4/2004 | El-Hennawey et al. | 370/230 |
| 2006/0259966 | A1 * | 11/2006 | Ilnicki | 726/22 |
| 2007/0177598 | A1 * | 8/2007 | Miyazaki et al. | 370/392 |
| 2008/0095247 | A1 * | 4/2008 | Ohno et al. | 375/240.28 |

* cited by examiner

*Primary Examiner* — Ronald Abelson  
(74) *Attorney, Agent, or Firm* — David L. Soltz (57) ABSTRACT

A propagation delay in the transmission of a frame from an initiator node to a peer node is determined by initially identifying a frame number and byte offset of a first incoming frame from the peer node at a time when the initiator node outputs a portion of a transmitted frame. The portion of the transmitted frame may be the first byte of a sub-frame within the transmitted frame. At the peer node, the frame number and byte offset of a second frame to be supplied to the initiator node is identified at a later time when the frame portion transmitted by the initiator node is received by the peer node, and such information is transmitted to the initiator node. Thus, since the frames output and received by the initiator node are typically of fixed duration, the frame number and byte offset of the incoming frame represent the time when the initiator node outputs the frame portion (a transmit time). In addition, the frame number and byte offset of the second frame represents the time at which the frame portion is received by the peer node (a receive time). Accordingly, by comparing the frame numbers and byte offsets of the first and second frames received from the peer node, a difference between transmit and receive times or propagation delay can be obtained.

14 Claims, 8 Drawing Sheets

METHOD AND APPARATUS FOR DETERMINING PROPAGATION DELAY IN A NETWORK

BACKGROUND

The International Telecommunications Union (ITU) has introduced the G.709 standard for "Interface for the Optical Transport Network (OTN)". This standard includes a set of recommendations by the ITU and provides for data to be transmitted in specific frames, each of which including a header.

G.709 includes recommendations directed toward networks in which multiple users transmit traffic over one or more portions of the same network. For example, a link including four nodes connected in series may carry traffic for a first user between the first and second nodes only, while a second user may transmit traffic from the first to the fourth nodes. In order to permit monitoring of each user's traffic, G.709 specifies that up to six Tandem Connection Monitoring (TCM) fields be provided in each header, such that each of up to six users is assigned a corresponding TCM field. The TCM fields can be processed at each node along a link carrying the traffic of a particular customer and terminated at end point nodes of the link. In addition, TCM fields may be used to designate portions of a network that may be monitored or controlled independently of each other.

Data carried in each TCM field may be calculated based on one or more parameters. One of these parameters is the propagation delay between nodes along the link. Conventionally, in order to determine the propagation delay, an initiating or initiator node sends a predetermined series of bits for each TCM to a peer node. The peer node, in turn, stores information indicative of the timing of the received bits for subsequent transmission back to the initiator node. As noted above, there may be up to six TCM fields in a given header, and, therefore, additional memory may be required in the peer node in order to store the timing-related information for each TCM field. If more TCMs are provided, the amount of storage or memory for storing such data would necessarily increase accordingly. Alternatively, the propagation delay may only be determined in connection with a single TCM field.

Moreover, propagation delay calculations are typically carried out by software, which may require a relatively long time to perform such calculations.

Accordingly, a simpler approach to determining propagation delay that is faster and requires less peer node memory is desired, for example, in a G.709 compliant network.

SUMMARY OF THE INVENTION

Consistent with an aspect of the present disclosure, a method is provided that comprises transmitting a first plurality of frames from a first node provided at a first location, and receiving a second plurality of frames from a second node provided at a second location spaced from the first location. The method further includes storing a value of a first temporal location in a first one of the second plurality of frames. The first temporal location corresponds to a first time when a portion of said one of the first plurality of frames is transmitted from the first node to the second node. In addition, the method includes storing a first frame number identifying the first one of the second plurality of frames and receiving a second value of a temporal location in a second one of the second plurality of frames. The second temporal location corresponds to a second time when the portion of said one of the first plurality of frames is received at the second node. Also, the method includes receiving a second frame number identifying the second one of the second plurality of frames, determining a length of time associated with a transmission of the portion of the said one of the first plurality of frames based on the first value, the first frame number, the second value, and the second frame number.

Consistent with an additional aspect of the present disclosure, a communication system is provided that comprises a first node provided at a first location and configured to transmit a first plurality of frames. The system also includes a second node provided at a second location and configured to receive the first plurality of frames and transmit a second plurality of frames to the first node. The first node is configured to receive the second plurality of frames. A memory is also provided that is configured to store a first value of a first temporal location in a first one of the second plurality of frames. The first temporal location corresponds to a first time when a portion of said one of the first plurality of frames is transmitted from the first node to the second node. The memory also stores a first frame number identifying the first one of the second plurality of frames. In addition, the first node receives a second value of a second temporal location in a second one of the second plurality of frames. The second temporal location corresponds to a second time when the portion of said one of the first plurality of frames is received at the second node. The first node also receives a second frame number identifying the second one of the second plurality of frames. Also, circuitry is provided that is configured to determine a length of time associated with a transmission of the portion of said one of the first plurality of frames based on the first value, the first frame number, the second value, and the second frame number.

It is to be understood that both the foregoing general description and the following detailed description are exemplary and explanatory only and are not restrictive of the invention, as claimed.

The accompanying drawings, which are incorporated in and constitute a part of this specification, and together with the description, serve to explain the principles of the present disclosure.

DESCRIPTION OF THE EMBODIMENTS

Consistent with the present disclosure, a first or initiator node supplies frames to a second or peer node. The peer node also supplies frames to the initiator node. A propagation delay in the transmission of a frame from the initiator node to the peer node is determined by initially identifying a frame number and byte offset of a first incoming frame from the peer node at a time when the initiator node outputs a portion of a transmitted frame. The portion of the transmitted frame may be the first byte of a sub-frame within the transmitted frame. At the peer node, the frame number and byte offset of a second frame to be supplied to the initiator node is identified at a later time when the frame portion transmitted by the initiator node is received by the peer node, and such information is transmitted to the initiator node. Thus, since the frames output and received by the initiator node are typically of fixed duration, the frame number and byte offset of the incoming frame represents the time when the initiator node outputs the frame portion (a transmit time). In addition, the frame number and byte offset of the second frame represents the time at which the frame portion is received by the peer node (a receive time). Accordingly, by comparing the frame numbers and byte offsets of the first and second frames received from the peer node, a difference between transmit and receive times can be obtained, and such time difference corresponds to the propagation delay in transmission between the peer and initiator nodes.

Moreover, the propagation delay, thus determined, may serve as a common propagation delay or reference for each TCM, for example. As a result, the peer node need only store the timing information associated with only propagation delay measurement, instead storing such information for each TCM. Thus, additional peer node memory is unnecessary, such that system design is simplified and costs are reduced.

Reference will now be made in detail to the present embodiments, examples of which are illustrated in the accompanying drawings. Wherever possible, the same reference numbers will be used throughout the drawings to refer to the same or like parts.

Figure 1:
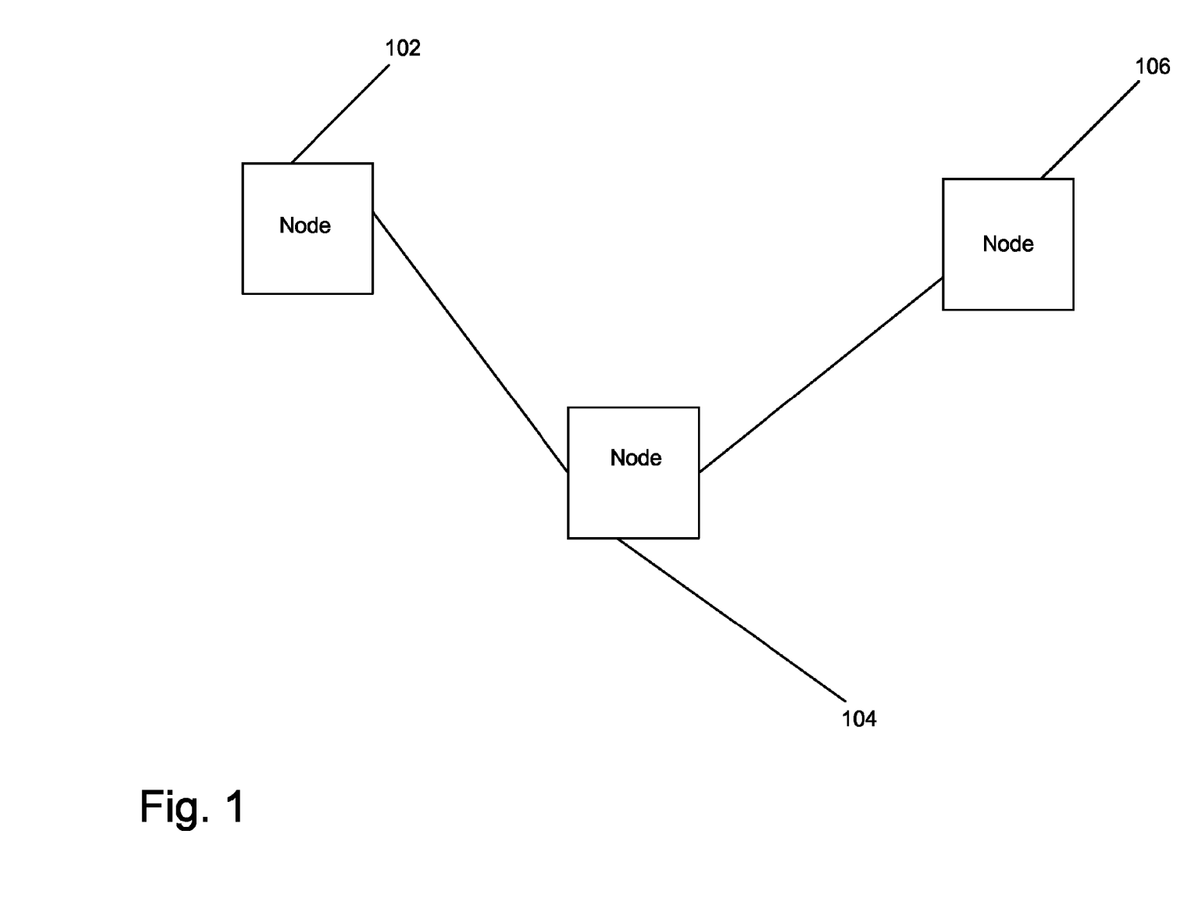
FIG. 1 illustrates a system consistent with an aspect of the present disclosure.

FIG. 1 illustrates a communication system 100 consistent with an aspect of the present disclosure. System 100 may include a plurality of nodes, such as nodes 102, 104, and 106. Nodes 102 and 104 communicate with one another over link 108, while nodes 104 and 106 communicate with one another over link 110. As discussed in greater detail below, data, in the form of frames may be output from node 102, for example, and supplied to node 104. The data may optionally be forwarded from node 104 to node 106.

Figure 2:
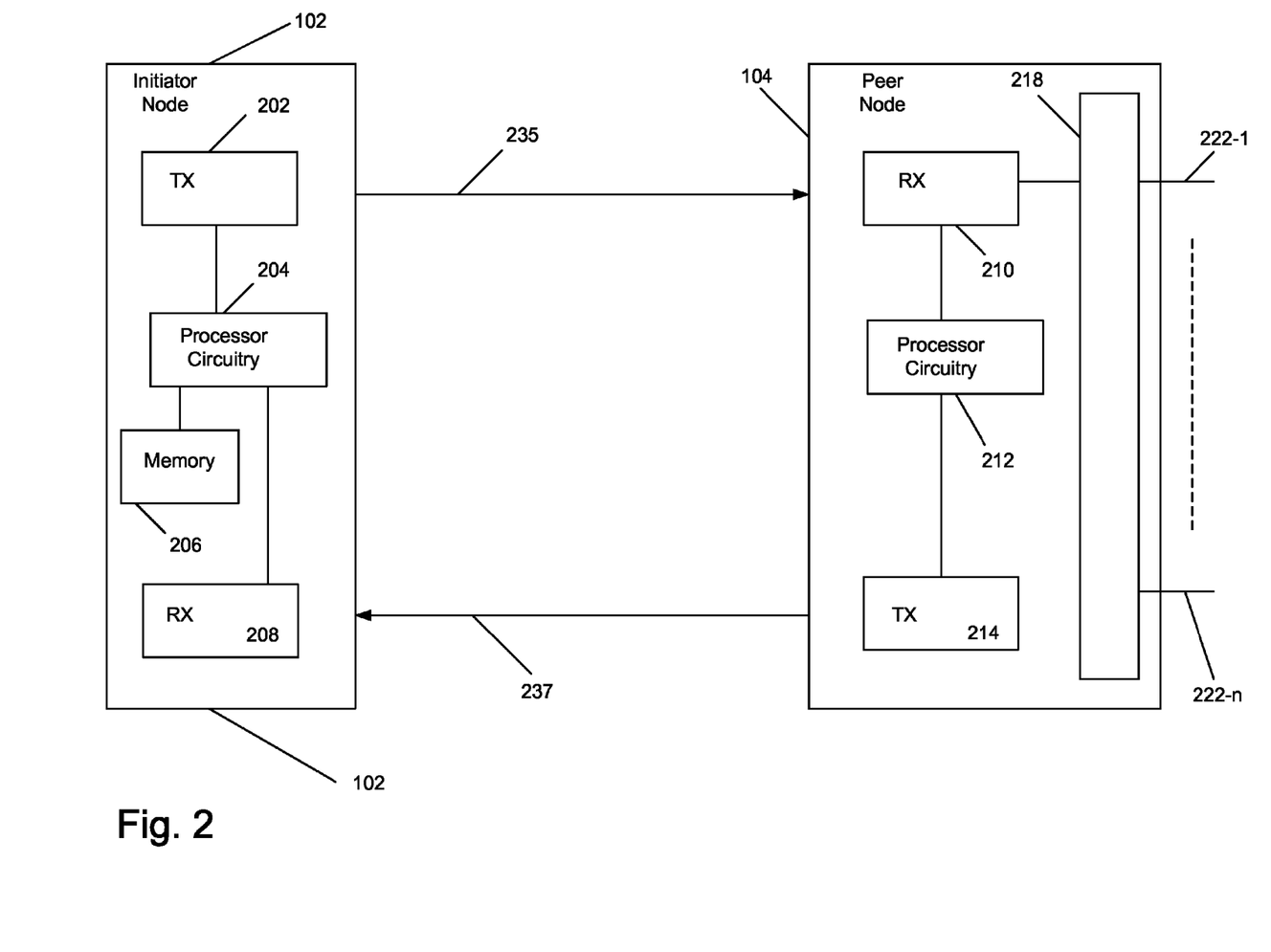
FIG. 2 illustrates a detailed block diagram of initiator and peer nodes consistent with an additional aspect of the present disclosure.

FIG. 2 illustrates nodes 102 and 104 in greater detail. For ease of explanation, nodes 102 and 104 may be referred to herein as initiator and peer nodes, respectively. As noted above, nodes 102 and 104 communicate with one another over link 108. Link 108 includes a downstream path 235 and an upstream path 237. Initiator node 102 may include a transmitter, which includes circuitry that encodes or otherwise process data and outputs and supplies an optical signal that carries the data as a first plurality of successive frames. The optical signal travels along downstream path 235, which may include an optical fiber, for example, to a receiver 210 in peer node 104. Receiver 210 may include circuitry for converting the optical signal to a corresponding electrical signal, as well as circuitry for processing that electrical signal and/or the data carried by it. For example, data carried by the electrical signal may be switched by switch 218, which is also provided node 104, and output from one of a plurality of output ports 222-1 to 222-n.

Peer node 104 include transmitter 214, which may be similar in construction and operation as transmitter 202. Namely, transmitter 214 may also include circuitry that encodes or otherwise processes data and outputs and supplies an optical signal that carries the data as a second plurality of successive frames. The optical signal travels along upstream path 237, which may also include an optical fiber, for example, to a receiver 208 in initiator node 102. Receiver 208 may include circuitry for converting the optical signal to a corresponding electrical signal, as well as circuitry for processing that electrical signal and/or the data carried by it.

As further shown in FIG. 2, processor circuitry 204 and 212 may be provided in the initiator (102) and peer (104) nodes, respectively. In addition, memory 206 is shown be coupled to processor circuitry 204. Processor circuitry 204 and 212 may control the operation of transmitter 202 and receiver 208 and may also collect information received from upstream path 237. The operation of processor circuitry 204 and 212 is described in greater detail below.

Figure 3:
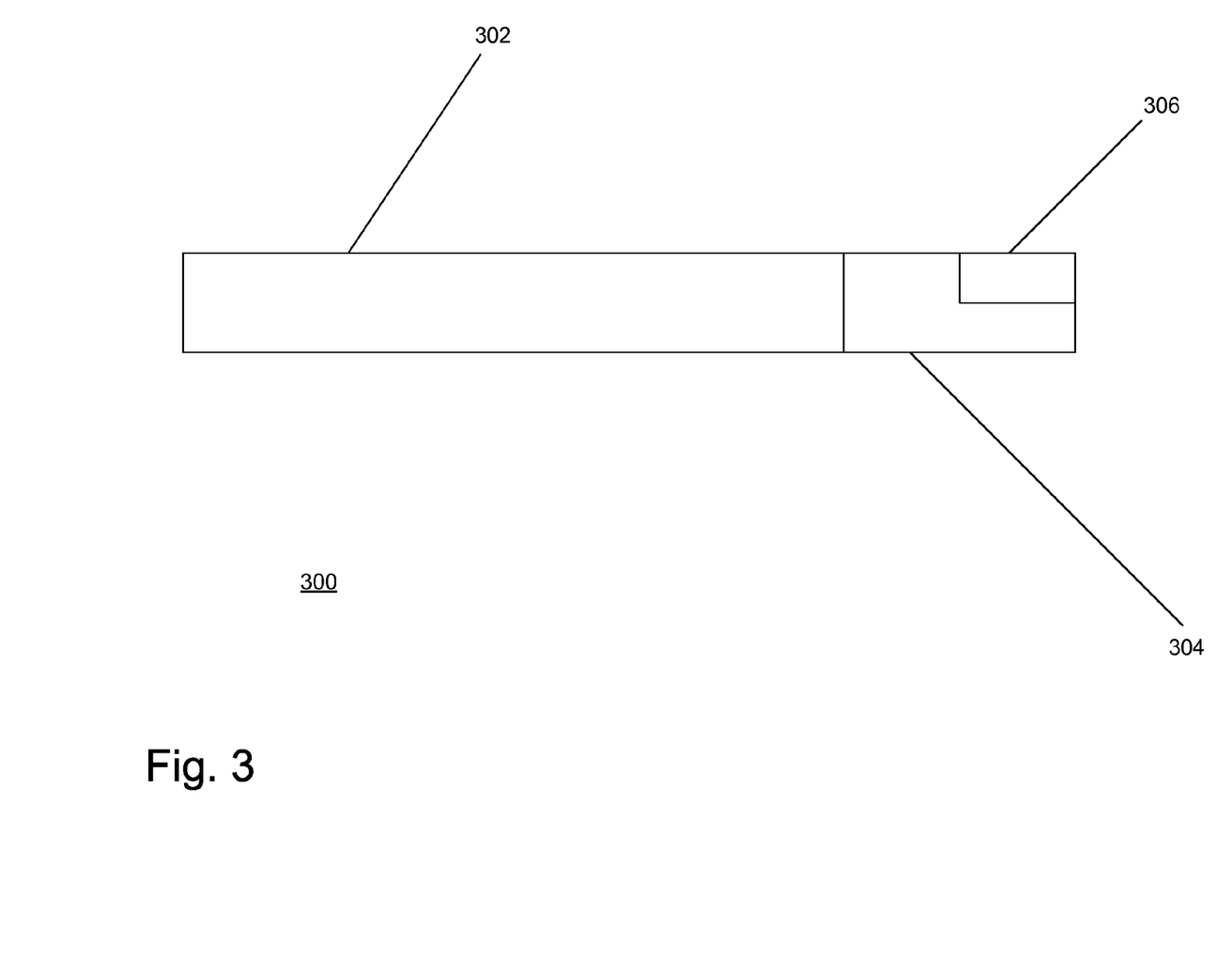
FIG. 3 illustrates a frame consistent with the present disclosure.

FIG. 3 illustrates an example of frame 300 that may be transmitted from either initiator node 102 or peer node 104. Frame 300 includes a payload portion 302 and an overhead portion 304. Frame 300 may be one of a series of frames, and overhead portion 304 may include a frame number 306 that identifies that frame within the series. For example, the first frame in the series may have a frame number of "1" the second "2" and so on. The series may be several thousand frames in length, and the frame numbers, accordingly, may number the frames up to the length of the series. A new sequence of frame numbers may be inserted into each of frames 300 after a particular series of frames has been transmitted. The frames output from node 102, as well as those output from 104, may be transmitted at a rate substantially equal to 40 Gbits/second.

Figure 4:
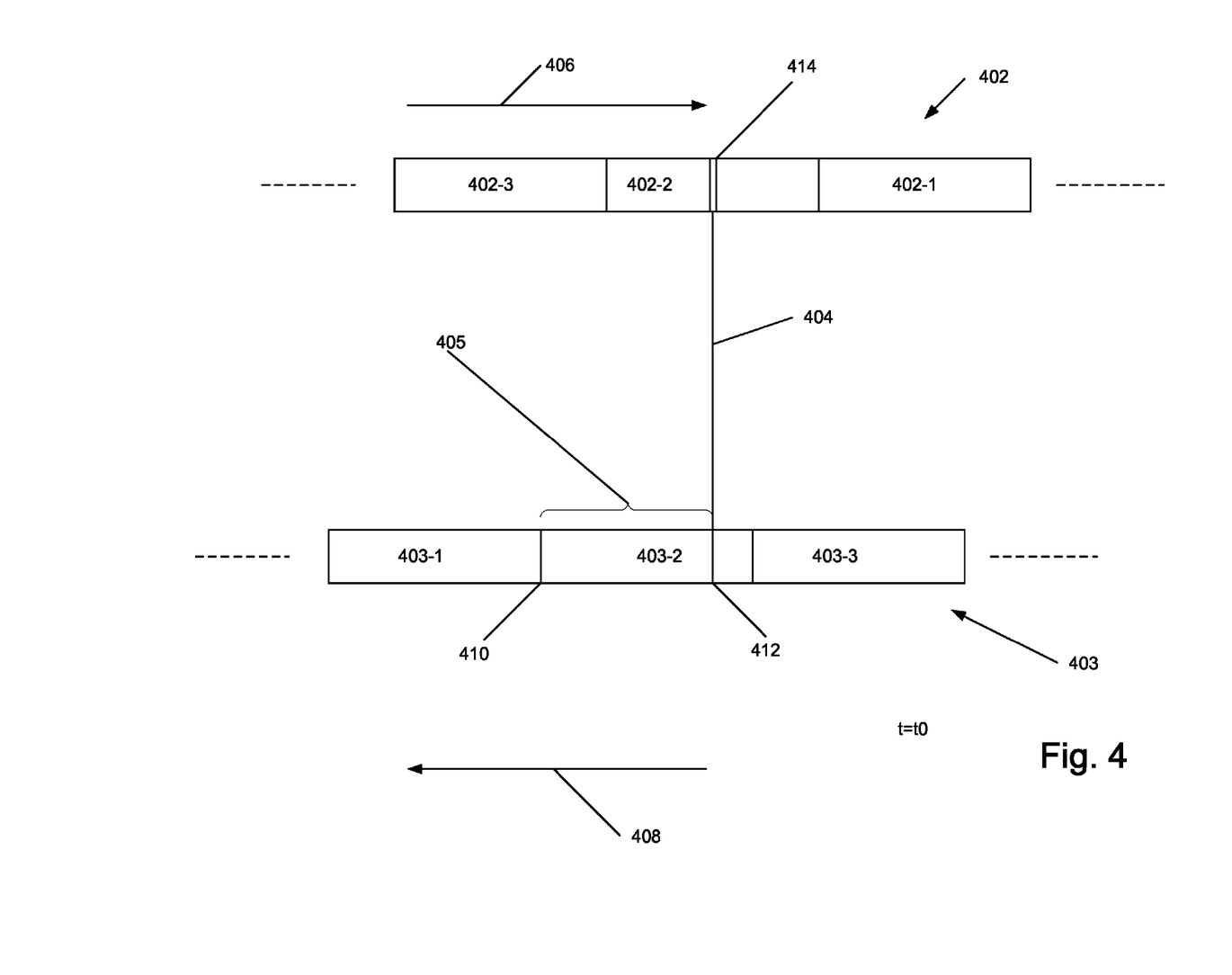
FIG. 4 illustrates a timing of frames supplied to and output from an initiator node consistent with the present disclosure.
Figure 5:
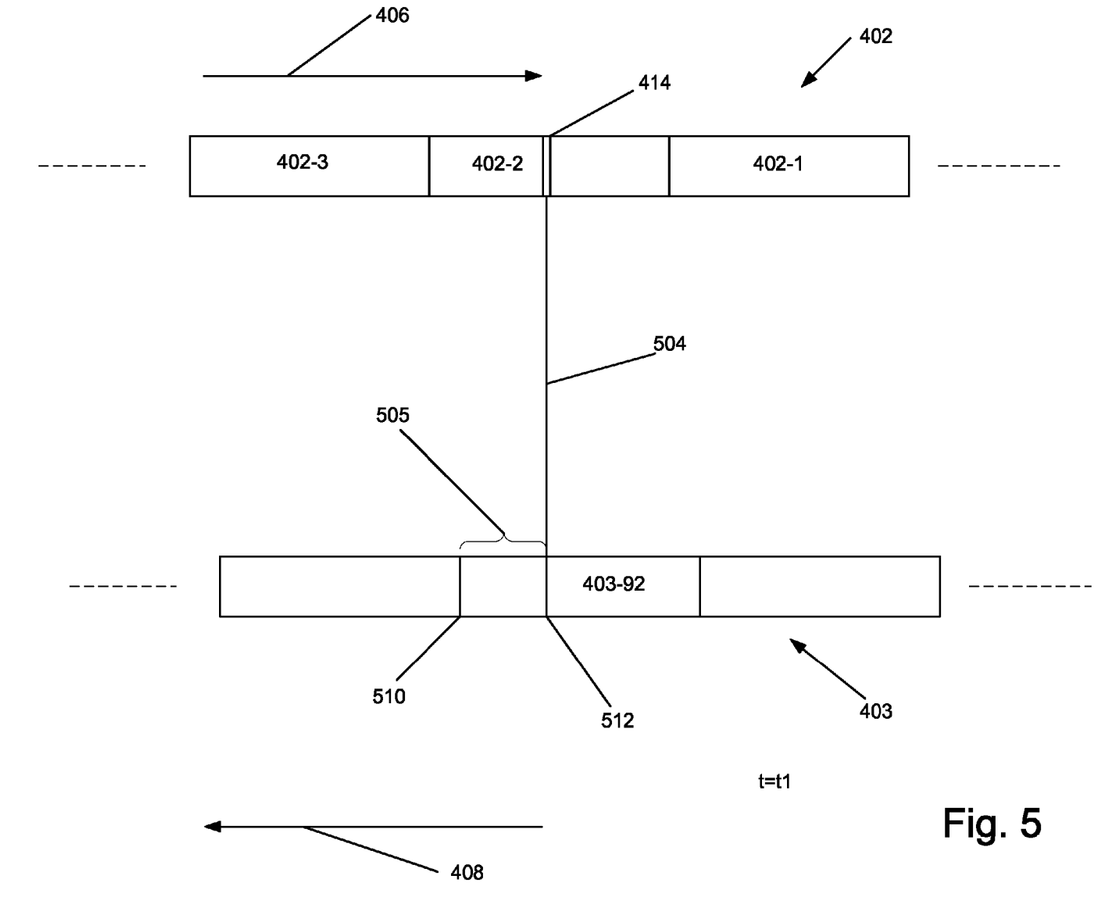
FIG. 5 illustrates a timing of frames supplied to and output from a peer node consistent with the present disclosure.
Figure 6:
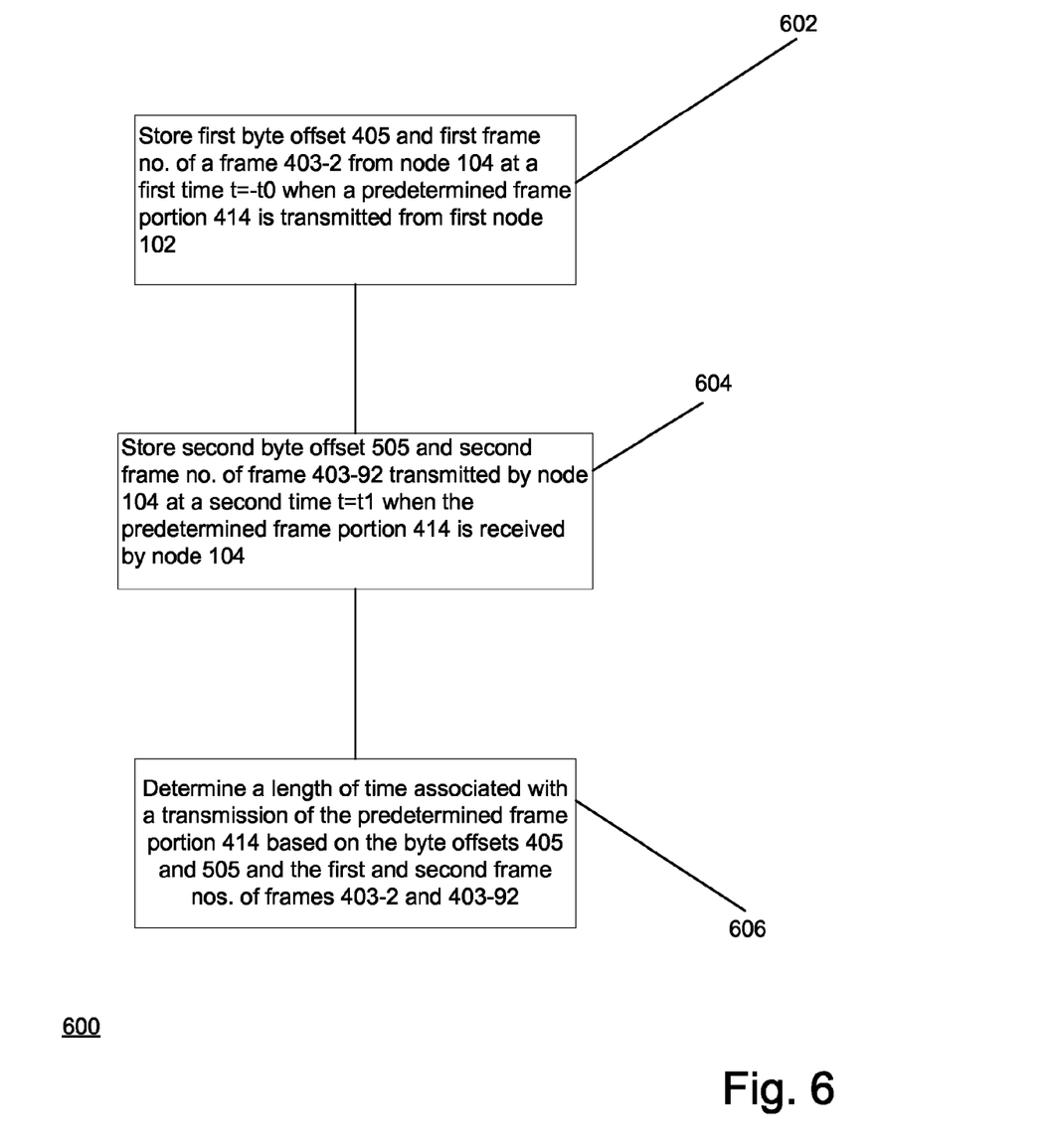
FIG. 6 illustrates a flow chart of a method consistent with an aspect of the present disclosure.

The operation of nodes 102 and 104 will next be described with reference to FIGS. 4-6. FIGS. 4 and 5 illustrate timing diagrams consistent with the present disclosure and FIG. 6 illustrates a flow chart 600 consistent with a further aspect of the present disclosure.

As noted above, initiator node 102 may receive a plurality of frames from peer node 104, as indicated by arrow 408. FIG. 4 shows the timing of received (403) and output or transmitted frames 402 at time t=t0 at initiator node 102. Three of the received frames are labeled 403-1, 403-2, and 403-3 in FIG. 4, while three of the transmitted frames are labeled 402-1, 402-2, and 402-3. At time t=t0 (note also line 404 indicating the portions of frames 402-2 and 403-2 occurring at time t=t0), for example, a predetermined frame portion 414 in frame 402-2 may be output from initiator 102 onto upstream path 235. Frame portion 414 may include a sub-frame in frame 402-2.

At t=t0, processor circuit 204 stores in memory 206, a first byte offset 405, which may be a value of temporal location 412 in frame 403-2 received from peer node 102 (step 602). Byte offset 405 is typically the number bytes between the beginning 410 of frame 403-2 and temporal location 412. Temporal location 412 may be identified by a byte number in frame 403 equal to the number of bytes of byte offset 405. In addition, processor circuit 204 may store the frame number associated with frame 403-2. Since each of the plurality of frames 403 has a fixed number of bytes and each byte has a given duration, the frame number and the byte offset 405, i.e., the value of temporal location 412, are indicative of or represent time t0.

As noted above, frame 402-2, along with other frames within the plurality of frames 402 is transmitted to peer node 104, as indicated by arrow 406 in FIG. 4. The plurality of frames 402 may be carried by an optical signal that is fed to receiver 210 of peer node 104. At time t=t1 (represented by line 504 in FIG. 5), frame portion 414 is received by peer node 104, and processor circuit 212 in peer node 104 identifies a byte offset 505 (a value of a temporal location 512 in an outgoing frame 403-92 equal to a number of bytes between the beginning 510 of frame 403-92 and temporal location 512) at the time t1. Processor circuit 212 also identifies the frame number of frame 403-92, which is one of the plurality of frames 403 output from peer node 104. The frame number of frame 403-92 and byte offset 505, i.e., the value of temporal location 512, represent time t1 for similar reasons as those noted above in connection with byte offset 405 and the frame number of frame 403-2.

Processor circuit 212 controls transmitter 214 in node 104 to output byte offset 505 and the frame number of frame 403-92 on an optical signal that is fed to receiver 208 of node 102 via upstream path 237. In one example, such frame number and byte offset information may be included in an overhead portion of one of the plurality of frames 403. Thus, node 102 receives the frame number of frame 403-92 and byte offset 505 (step 604). Processor circuit 204, next computes or determines a length of time or propagation delay (the difference between times t0 and t1) associated with the transmission of frame portion 414 based on byte offsets 405 and 505, as well as frame numbers of frames 402-2 and 403-92 (step 606).

In particular, processor 204 may calculate the propagation delay PD in accordance with the following formula:

$$PD=[(FN\_1 * L + Byte\_Offset\_1) - (FN\_2 * L + Byte\_Offset\_2)] * Byte\_Period,$$

where:
  FN_1=the frame number of frame 403-2,
  FN_2=the frame number of frame 403-92,
  Byte_Offset_1=byte offset 405
  Byte_Offset_2=byte offset 505
  L=the length in bytes of each of frames 402 and 403, and
  Byte_Period=the duration of each byte, i.e., the time period during which a byte is output from either transmitter 202 or transmitter 214.

Figure 7A:
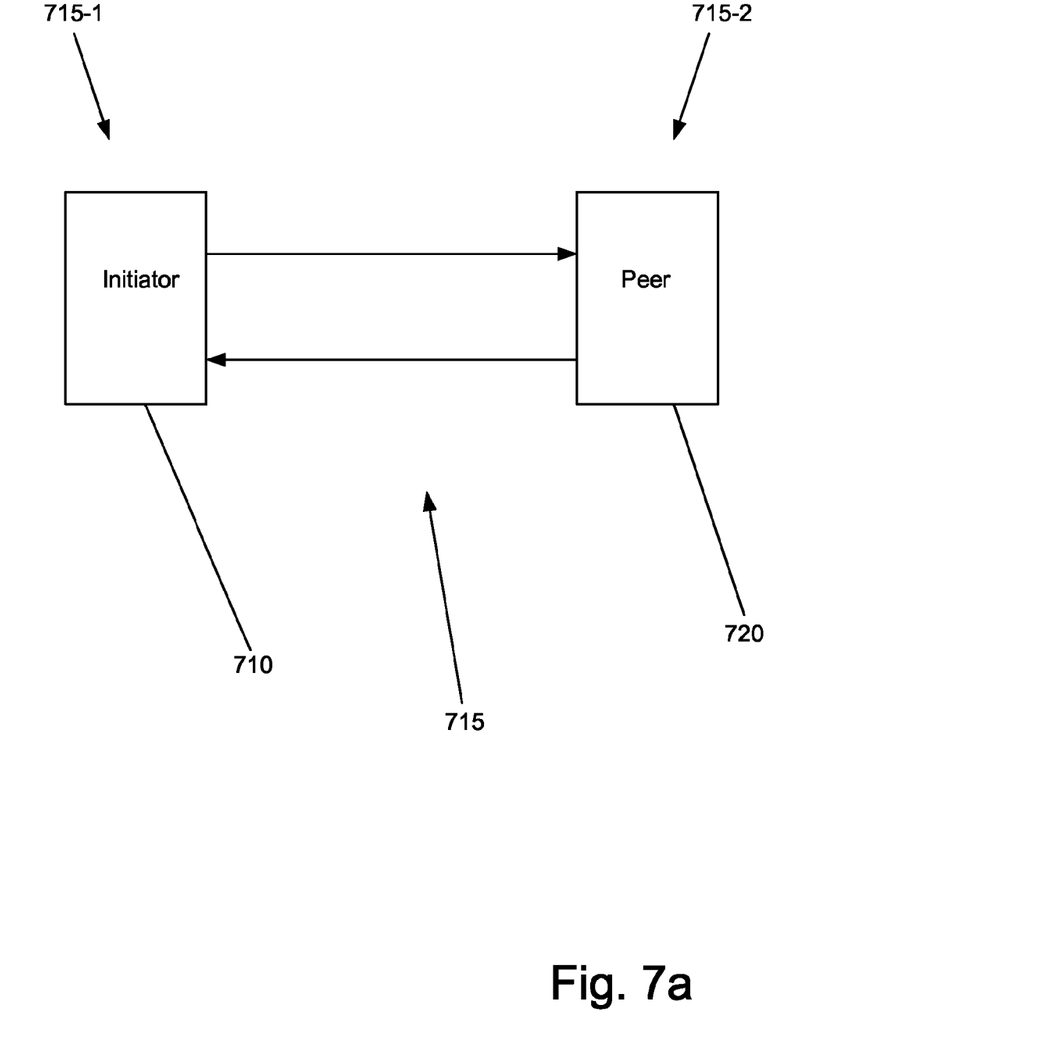
FIG. 7a illustrates a link consistent with an additional aspect of the present disclosure.

As noted above, the propagation delay determined in accordance with an aspect of the present disclosure may serve as a common propagation delay for each TCM terminated at a particular node. For example, as shown in FIG. 7a, initiator node 710 may terminate fields TCM1 to TCM6 at first end 715-1 of link 715, while peer node 720 terminates these TCMs at second end 715-2 of link 715. Hardware and/or software in nodes 710 and 720 may use a propagation delay calculated in the manner discussed above to incorporate appropriate error or timing values in each of fields TCM1 to TCM6. Different propagation delays need not be determined to calculate such error and timing values for each TCM field. Accordingly, peer node 720 need only store the timing information noted above for one propagation delay measurement, instead of storing such information for each TCM field. As a result, additional memory or storage is unnecessary, such that system design is simplified and costs are reduced. Nodes 710 and 720 may have a similar structure as nodes 102 and 104 discussed above.

If the TCM fields are terminated at different nodes, different propagation delay values may be calculated in a manner similar to that discussed above.

It is noted that the method for determining propagation delay discussed above may be carried out in hardware, such as hardwired logic, and need not be calculated with software. Hardware, such as hardwired logic, may operate faster than software, and, therefore, propagation delay may be calculated in a relatively short time consistent with the present disclosure.

Figure 7B:
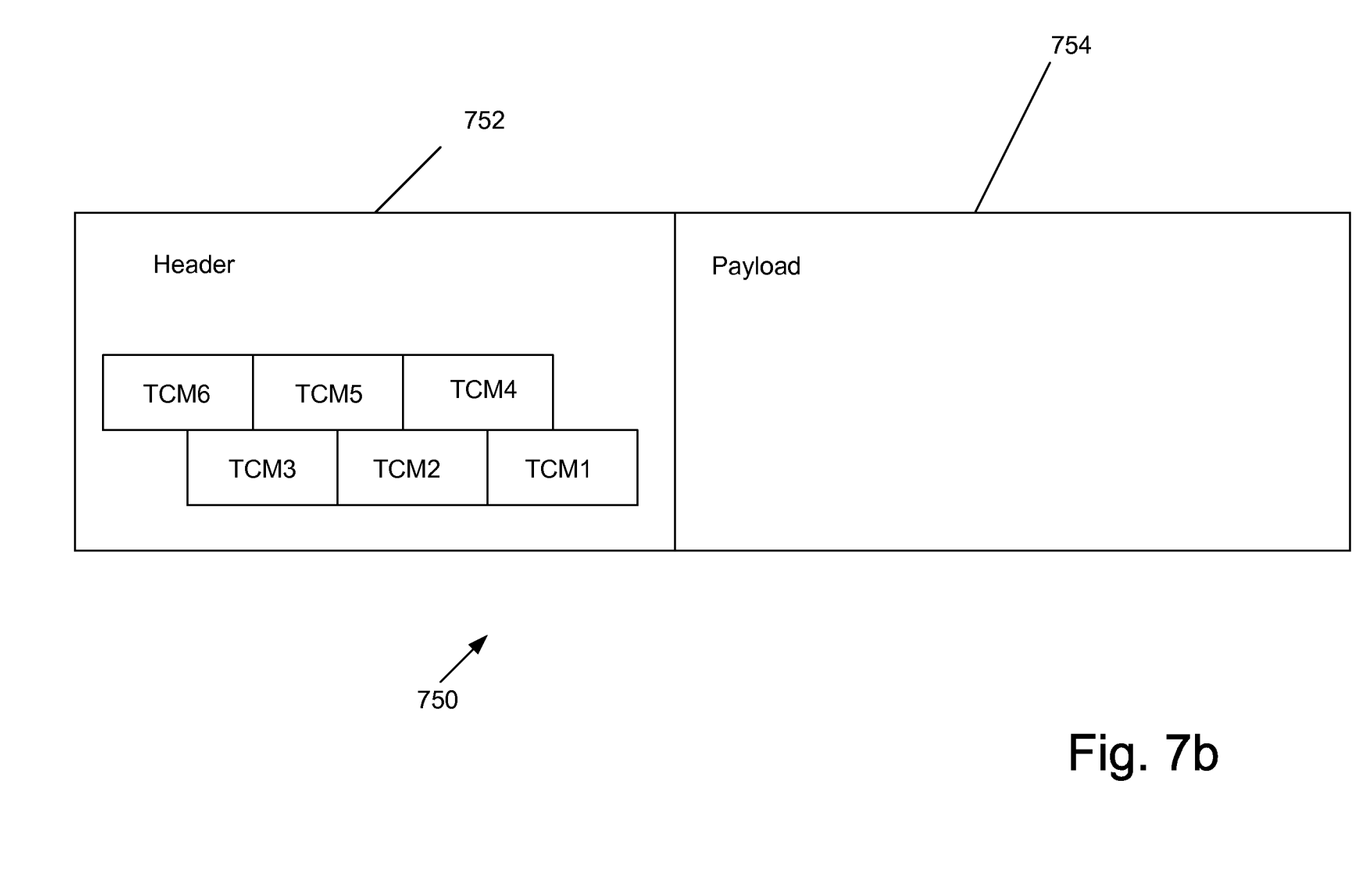
FIG. 7b illustrates an example of a frame compliant with the G.709 standard.

FIG. 7b illustrates a simplified view of a G.709 compliant frame 750, which includes header 752 and payload 754. Fields TCM1 to TCM6 are shown in header 752, which may also be referred to as the overhead portion of frame 750. Frame 300 shown in FIG. 3 may also be G.709 compliant and have a structure similar to that shown in FIG. 7b.

The length of each byte discussed above may be 8 bits. It is understood, however, that bytes having any number of bits or even a single bit may be provided in accordance with the present disclosure. Preferably, however, each byte should include the same number of bits.

Other embodiments of the invention will be apparent to those skilled in the art from consideration of the present disclosure. It is intended that the specification and examples be considered as exemplary only, with a true scope and spirit of the invention being indicated by the following claims.

What is claimed is:

1. A method, comprising:
  transmitting a first plurality of frames from a first node provided at a first location;
  receiving, at the first node, a second plurality of frames from a second node provided at a second location spaced from the first location;
  storing in a memory a first value of a first temporal location in a first one of the second plurality of frames, the first temporal location corresponding to a first time when a portion of said one of the first plurality of frames is transmitted from the first node to the second node;
  storing in the memory a first frame number identifying the first one of the second plurality of frames;
  receiving, at the first node, a second value of a second temporal location in a second one of the second plurality of frames, the second temporal location corresponding to a second time, after the first time, when the portion of said one of the first plurality of frames is received at the second node;
  receiving, at the first node, a second frame number identifying the second one of the second plurality of frames; and
  determining a length of time associated with a transmission of the portion of said one of the first plurality of frames based on the first value, the second value, the first frame number, and the second frame number,
  wherein each of the first plurality of frames includes an overhead section and a payload section,
  wherein the first plurality of frames includes a first bytes, and the second plurality of frames includes a second bytes, such that a number of said first bytes (L) in each of the first plurality of frames is equal to a number of said second bytes in each of the second plurality of frames, each of the first bytes being output from the first node during a byte period (Byte_Period), and each of the second bytes is output from the second during the byte period, the first value is indicative of the first temporal location being a first position in said first one of the second plurality of frames that is temporally spaced from a beginning of said first one of the second plurality of frames by a first plurality of said byte periods (Byte_Offset_1), and the second value is indicative of the second temporal location being a second position in said second one of the second plurality of frames that is temporally spaced from a beginning of said second one of the second plurality of frames by a second plurality of said byte periods (Byte_Offset_2), said determining the length of time (PD) associated with the transmission of the portion of the said one of the first plurality of frames from the first node to the second node is in accordance with:

$$PD=[(FN\_1 * L + Byte\_Offset\_1) - (FN\_2 * L + Byte\_Offset\_2)] * Byte\_Period,$$

where: FN_1=the first frame number,
FN_2=the second frame number.

2. A method in accordance with claim 1, further including:
transmitting the second frame number and the second value from the second node to the first node,
wherein said storing the first frame number and the first value is at the first node and said storing the second frame number and the second value is at the first node.

3. A method in accordance with claim 2, wherein each of the second plurality of frames includes a corresponding one of a plurality of overhead sections and a corresponding one of a plurality of payload sections, the method further including providing the second frame number and the second value in one of the plurality of overhead sections.

4. A method in accordance with claim 1, further including:
transmitting a first optical signal from the first node to the second node, the first optical signal carrying the first plurality of frames; and
transmitting a second optical signal from the second node to the first node, the second optical signal carrying the second plurality of frames.

5. A method in accordance with claim 1, wherein the second node includes a plurality of output ports, the method further including switching said one of the first plurality of frames at the second node such that said one of the first plurality of frames is supplied from one of the plurality of output ports of the second node.

6. A method in accordance with claim 1, wherein said determining the length of time associated with a transmission of the portion of the said one of the first plurality of frames from the first node to the second node is at the first node.

7. A method in accordance with claim 1, further including:
transmitting the first frame number from the second node to the first node; and
transmitting the second frame number and the second value from the second node to the first node,
wherein said storing the first frame number and the first value is at the first node.

8. A communication system comprising:
a first node provided at a first location, the first node being configured to transmit a first plurality of frames;
a second node provided at a second location, the second node being configured to receive the first plurality of frames and transmit a second plurality of frames to the first node, the first node being configured to receive the second plurality of frames;
a memory configured to store:
a first value of a first temporal location in a first one of the second plurality of frames, the first temporal location corresponding to a first time when a portion of said one of the first plurality of frames is transmitted from the first node to the second node, and
a first frame number identifying the first one of the second plurality of frames,
wherein the first node receives a second value of a second temporal location in a second one of the second plurality of frames, the second value corresponding to a second time, after the first time, when the portion of said one of the first plurality of frames is received at the second node, the first node also receives a second frame number identifying the second one of the second plurality of frames; and
circuitry configured to determine a length of time associated with a transmission of the portion of the said one of the first plurality of frames based on the first value, the first frame number, the second value, and the second frame number,
wherein each of the first plurality of frames includes an overhead section and a payload section,
wherein the first plurality of frames includes a first bytes, and the second plurality of frames includes a second bytes, such that a number of said first bytes (L) in each of the first plurality of frames is equal to a number of said second bytes in each of the second plurality of frames, each of the first bytes being output from the first node during a byte period (Byte_Period), and each of the second bytes is output from the second during the byte period, the first value being indicative of temporal location being a first position in said first one of the second plurality of frames that is temporally spaced from a beginning of said first one of the second plurality of frames by a first plurality of said byte periods (Byte_Offset_1), and the second value being indicative of temporal location being a second position in said second one of the second plurality of frames that is temporally spaced from a beginning of said second one of the second plurality of frames by a second plurality of said byte periods (Byte_Offset_2), the circuitry being configured to determine the length of time (PD) associated with the transmission of the portion of the said one of the first plurality of frames from the first node to the second node is in accordance with:

PD=[(FN_1*$L$+Byte_Offset_1)−(FN_2*$L$+Byte_Offset_2)]*Byte_Period, where: FN_1=the first frame number,
FN_2=the second frame number.

9. A system in accordance with claim 8, wherein the second node is configured to transmit the second frame number and the second value to the first node.

10. A system in accordance with claim 9, wherein each of the second plurality of frames includes a corresponding one of a plurality of overhead sections and a corresponding one of a plurality of payload sections, the second node being configured provide the second frame number and the second value in one of the plurality of overhead sections.

11. A system in accordance with claim 8, further including:
a first optical transmitter provided in the first node, the first optical transmitter being configured to transmit a first optical signal from the first node to the second node, the first optical signal carrying the first plurality of frames; and
a second optical transmitter provided in the second node, the second optical transmitter being configured to transmit a second optical signal from the second node to the first node, the second optical signal carrying the second plurality of frames.

12. A system in accordance with claim 8, wherein the second node includes a plurality of output ports, the second node being configured to switch said one of the first plurality of frames, such that said one of the first plurality of frames is supplied from one of the plurality of output ports of the second node.

13. A system in accordance with claim 8, wherein the circuitry is included in the in the first node.

14. A system in accordance with claim 8, wherein the memory is included in the first node.

* * * * *